United States Patent
Boulay et al.

(10) Patent No.: US 9,369,838 B2
(45) Date of Patent: Jun. 14, 2016

(54) METHOD AND SYSTEM FOR ESTIMATING A POSITION OF A TARGET USING A PLURALITY OF SMARTPHONES

(71) Applicant: Otodata Wireless Network, Inc., Saint-Laurent (CA)

(72) Inventors: Andre Boulay, Ile Bizard (CA); Jason M. Gallovich, Dorval (CA); Simon Noel, Laval (CA)

(73) Assignee: OTODATA WIRELESS NETWORK INC., Quebec (CA)

( * ) Notice: Subject to any disclaimer, the term of this patent is extended or adjusted under 35 U.S.C. 154(b) by 0 days.

(21) Appl. No.: 14/367,217

(22) PCT Filed: Dec. 21, 2012

(86) PCT No.: PCT/CA2012/001180
§ 371 (c)(1),
(2) Date: Jun. 19, 2014

(87) PCT Pub. No.: WO2013/091077
PCT Pub. Date: Jun. 27, 2013

(65) Prior Publication Data
US 2015/0005002 A1    Jan. 1, 2015

Related U.S. Application Data

(60) Provisional application No. 61/578,723, filed on Dec. 21, 2011.

(51) Int. Cl.
*H04W 4/02* (2009.01)
*G01S 5/00* (2006.01)
*G01S 5/02* (2010.01)
*G06Q 10/08* (2012.01)
*H04W 4/20* (2009.01)
(Continued)

(52) U.S. Cl.
CPC .............. *H04W 4/02* (2013.01); *G01S 5/0072* (2013.01); *G01S 5/0294* (2013.01); *G01S 19/48* (2013.01);
(Continued)

(58) Field of Classification Search
CPC ........ H04W 64/00; H04W 8/005; H04W 4/02; H04W 74/04; H04W 4/008; H04W 4/20; H04W 68/00; H04W 68/025
USPC ........................................... 455/456.1
See application file for complete search history.

(56) References Cited

U.S. PATENT DOCUMENTS

| | | | |
|---|---|---|---|
| 6,433,685 | B1 | 8/2002 | Struble et al. |
| 6,900,731 | B2 | 5/2005 | Kreiner et al. |

(Continued)

FOREIGN PATENT DOCUMENTS

| | | |
|---|---|---|
| EP | 1336277 | 8/2003 |
| EP | 1337985 | 8/2003 |

OTHER PUBLICATIONS

International Search Report and Written Opinion, PCT/CA2012/001180, Applicant; Otodata Wireless Network Inc., Mail date: Jun. 27, 2013, 6 pgs.

*Primary Examiner* — Kwasi Karikari
(74) *Attorney, Agent, or Firm* — Pearl Cohen Zedek Latzer Baratz LLP

(57) ABSTRACT

A method is disclosed for estimating a position of a target using a plurality of smartphones, each smartphone being capable of communicating with the target over a limited wireless range, the method comprising providing a target transmitting a wireless signal having a corresponding identification for uniquely identifying the target; providing the corresponding identification of the target to track to a group of smartphones; each smartphone of the group of smartphones being capable of receiving the signal transmitted if the target is in its vicinity and storing the corresponding identification of the target with a time stamp and an indication of a corresponding location of the smartphone and obtaining each of the stored corresponding identifications of the target with a time stamp and an indication of a corresponding location of the smartphone to thereby estimate a position of the target.

18 Claims, 11 Drawing Sheets

(51) Int. Cl.
*H04M 1/725* (2006.01)
*G01S 19/48* (2010.01)
*H04W 64/00* (2009.01)
*G08B 21/24* (2006.01)

(52) U.S. Cl.
CPC ............. *G06Q 10/08* (2013.01); *H04M 1/7253* (2013.01); *H04W 4/028* (2013.01); *H04W 4/20* (2013.01); *G08B 21/24* (2013.01); *H04M 1/72577* (2013.01); *H04W 64/00* (2013.01)

(56) References Cited

U.S. PATENT DOCUMENTS

| | | |
|---|---|---|
| 6,917,290 B2 | 7/2005 | Land |
| 7,088,242 B2 | 8/2006 | Aupperle et al. |
| 7,119,658 B2 | 10/2006 | Stilp |
| 7,879,111 B2 | 2/2011 | Hardacker et al. |
| 2004/0198392 A1* | 10/2004 | Harvey ................. H04L 63/107 455/456.1 |
| 2009/0253402 A1* | 10/2009 | Choo .................... G08B 25/016 455/404.2 |
| 2010/0291894 A1* | 11/2010 | Pipes ...................... H04W 4/02 455/404.2 |
| 2010/0323722 A1* | 12/2010 | Hatami ............. G01C 21/3438 455/456.3 |
| 2011/0057797 A1* | 3/2011 | Parker .................... G08B 21/22 340/568.1 |
| 2011/0195701 A1 | 8/2011 | Cook et al. |

* cited by examiner

METHOD AND SYSTEM FOR ESTIMATING A POSITION OF A TARGET USING A PLURALITY OF SMARTPHONES

CROSS-REFERENCE TO RELATED APPLICATION

This patent application is a National Phase Application of PCT International Application No. PCT/CA2012/001180, International Filing Date Dec. 21, 2012, which claims priority from U.S. Provisional Patent Application No. 61/578,723 entitled "Method and System for Estimating a Position of a Target Using a Plurality of Smartphones" that was filed on Dec. 21, 2011, the specification of which is hereby incorporated by reference.

FIELD OF THE INVENTION

The invention relates to the field of electronics. More precisely, this invention pertains to a method and system for estimating a position of a target using a plurality of smartphones.

BACKGROUND

Being able to readily track an item or a good is of interest for obvious reasons. Unfortunately a lot of resources may be required in order to be able to achieve this goal.

In fact, a dedicated infrastructure for detecting a target may have to be built in order to be able to track a target. In particular, detectors may have to be placed at strategic locations in order to be able to find out where the target is.

For instance, U.S. Pat. No. 7,088,242 teaches a collective personal tracking system in which a target to track is provided with an RFID tag. Unfortunately, the system still requires a plurality of tracking processors that have to be designed in order to be able to detect the RFID tag on the target. The person skilled in the art will appreciate that such system will therefore require a lot of resources in order to be implemented.

There is therefore a need for a method and system that will overcome at least one of the above-identified drawbacks.

Features of the invention will be apparent from review of the disclosure, drawings and description of the invention below.

BRIEF SUMMARY

According to a broad aspect of the invention, there is provided a method for estimating a position of a target using a plurality of smartphones, each smartphone being capable of communicating with the target over a limited wireless range, the method comprising providing a target transmitting a wireless signal having a corresponding identification for uniquely identifying the target; providing the corresponding identification of the target to track to a group of smartphones; each smartphone of the group of smartphones being capable of receiving the signal transmitted if the target is in its vicinity and storing the corresponding identification of the target with a time stamp and an indication of a corresponding location of the smartphone; obtaining each of the stored corresponding identifications of the target with a time stamp and an indication of a corresponding location of the smartphone to thereby estimate a position of the target.

In one embodiment, each of the plurality of smartphones comprises a localization system.

In another embodiment, the localization system comprises at least one of a Global Positioning System (GPS) receiver and a Wifi™ hotspot mapping system.

In yet another embodiment, the wireless signal is a short-range wireless signal.

In one embodiment, the short-range wireless signal is transmitted according to a communication standard selected from a group consisting of Bluetooth™ and Wifi™.

In yet another embodiment, the corresponding identification comprises a medium access control (MAC) address used by the target for transmitting the wireless communication signal.

In yet another embodiment, the identification for uniquely identifying the target comprises a modified medium access control (MAC) address.

In one embodiment, the providing of the corresponding identification of the target to track to a group of smartphones comprises determining a subset of smartphones and broadcasting a request for tracking the target to each smartphone of the subset of smartphones.

In yet another embodiment, the determining of the subset of smartphones is performed according at least one criterion.

In one embodiment, the at least one criterion is selected from a group consisting of a determined rough estimation of a probable location of the target to track, a type of wireless communication signal supported by the target to track, a given group of users.

In yet another embodiment, the request for tracking the target comprises an identification of the target to track and at least one other parameter.

In yet another embodiment, the at least one other parameter comprises at least one of a description of the target, a command to disable the target and a command to turn the target off.

In yet another embodiment, the description of the target comprises at least one of a picture, a caption, model information and specification.

In one embodiment, the method further comprises receiving a list of at least one target to track; determining if the corresponding identification of the target matches the list of at least one target to track and performing the storing if the corresponding identification of the target matches the list.

In yet another embodiment, the method further comprises storing additional information selected from a group consisting of a target status and a user input information.

In yet another embodiment, the obtaining of each of the stored corresponding identifications of the target with a time stamp and an indication of a corresponding location of the smartphone comprises receiving each of the stored corresponding identifications of the target with a corresponding time stamp and a corresponding indication of a location of the smartphone and filtering the stored corresponding identifications of the target using the corresponding time stamps to remove the stored corresponding identifications of the target having corresponding time stamps older than a given value and the stored corresponding indications of a location for which the corresponding time stamps are older than a given value.

In another embodiment, the obtaining of each of the stored corresponding identifications of the target with a time stamp and an identification of a corresponding location of the smartphone comprises determining a pertinent communication channel for transmitting each of the stored corresponding identifications of the target with a time stamp and an identification of a corresponding location of the smartphone.

In accordance with an embodiment, the determining is performed according to at least one criterion selected from a group comprising cost and availability.

In accordance with another embodiment, the pertinent communication channel is selected from a group consisting of Wifi™, Bluetooth™ and a cellular data network.

In accordance with one aspect of the invention, there is disclosed a method for estimating a position of a target using a plurality of smartphones, each smartphone being capable of communicating with the target over a limited wireless range, the method comprising receiving from a plurality of smartphones a corresponding plurality of identifications of the target to track together with corresponding time stamps and corresponding indications of the locations of the corresponding smartphone; storing the plurality of received identifications of the target to track together with the corresponding time stamps and the corresponding indications of the locations of the corresponding smartphones; determining an estimation of the location of the target using the stored plurality of received identifications of the target to track together with the corresponding time stamps and the corresponding indications of the locations of the corresponding smartphones; and providing the determined estimation of the location of the target.

In accordance with another aspect of the invention, there is disclosed a method for obtaining an indication of a probability that a target has been stolen, the method comprising obtaining a list of at least one usual location for the target; obtaining a list of at least one unusual location for the target; obtaining an estimation of a location of the target using the method disclosed above; determining if the obtained estimation of the location is in the list of at least one usual location for the target; providing an indication of a zero probability of theft if the obtained estimation of the location is in the list of at least one usual location for the target; determining if the obtained estimation of the location is in the list of at least one unusual location for the target; and providing an indication of a low probability of theft if the obtained estimation of the location is in the list of at least one unusual location for the target.

In accordance with one embodiment, the estimation of the location of the target is obtained over a given period of time; further providing an indication of a high probability of theft if no estimation of the location of the target is obtained for the given period time.

In accordance with one embodiment, the method further comprises obtaining the estimation of the location of the target over a given period of time; wherein the obtaining of the estimation of the location of the target over a given period of time is performed in response to a request from a user.

In accordance with one embodiment, the request from a user is transmitted over a data network using a smartphone.

In accordance with one embodiment, the request from the user comprises an identification of the target and the indication of a probability is provided to the smartphone of the user transmitting the request.

In accordance with one embodiment, the method further comprises detecting a change in the indication of a probability over time and providing a notification to the user upon detection of the change in the indication of a probability.

In accordance with an embodiment, the providing of the notification comprises at least one of sending a short message system (SMS) message to the user and providing a voicemail to the user.

In accordance with one embodiment, the notification is provided to the user for a fee.

In accordance with another embodiment, the notification is provided to the user if the smartphone of the user is one of the plurality of smartphones being capable of communicating with the target over a limited wireless range.

In accordance with another aspect of the invention, there is disclosed a method for providing an automatic inventory system to a user, the method comprising registering a plurality of targets, each of the plurality of targets being capable of communicating with a processing device over a limited wireless range; obtaining an estimation of the location of each of the plurality of registered targets using a processing device and storing the estimation of the location of each of the plurality of registered targets over time.

In accordance with one embodiment, the registering of the plurality of targets comprises detecting a plurality of potential targets around the user using a smartphone of the user and inviting the user to register at least one new target.

In accordance with another embodiment, the detecting of a plurality of potential targets around the user is performed using a media access control (MAC) address.

In accordance with another embodiment, the registering of the plurality of targets comprises receiving from the user registering a given target at least one of a serial number of the target, owner information for the target and a detailed description of the target.

In accordance with another embodiment, the registering comprises associating the at least one new target to the user performing the registration.

In accordance with another embodiment, the obtaining of an estimation of the location of each of the plurality of registered targets is performed at regular intervals and the method further comprises determining if the estimation of the location has changed over time and providing a notification to the user.

In accordance with a broad aspect of the invention, there is disclosed a method for preventing theft of a target using a plurality of smartphones, each smartphone being capable of communicating with the target over a limited wireless range, the method comprising obtaining a list of at least one target declared stolen; using a smartphone of a plurality of smartphones, receiving an identification of a potential target declared stolen; transmitting the received identification of a potential target declared stolen to a remote location; determining if the transmitted received identification of a potential target declared stolen is in the list of at least one target declared stolen; if the transmitted received identification of a potential target declared stolen is in the list of at least one target declared stolen; obtaining from the smartphone an indication of a corresponding location of the smartphone and a corresponding timestamp and providing an indication that the potential target declared stolen has been located.

In accordance with one embodiment, the indication that the potential target declared stolen has been located is provided to at least one of the smartphone and a third party.

In accordance with another embodiment, the indication that the potential target declared stolen has been located is provided to the smartphone and the method further comprises providing additional data to at least one of the smartphone.

In accordance with another embodiment, the additional data comprises at least one of a description of the target, an indication of a model of the target and a picture of the target.

In accordance with another embodiment, the method further comprises providing an incentive to a user of the smartphone.

In accordance with another embodiment, the method further comprises modifying a value of the incentive over time.

In accordance with another embodiment, the providing of the incentive to a user comprises splitting the incentive between a plurality of users.

In accordance with a broad aspect of the invention there is disclosed a method for enabling a third party to monitor a transfer of ownership of a target between a first user and a second user, each of the first user and the second user carrying a corresponding smartphone capable of communicating with the target over a limited wireless range, the method comprising providing each of the two smartphones with an application for providing a reporting signal to a third party upon detection of a given indication of a signal transmitted by the target over the limited wireless range; the third party receiving over time the reporting signal from the smartphone of the first user; the third party receiving the reporting signal from each of the two smartphones; and the third party receiving the reporting signal from the smartphone of the second user.

In accordance with one embodiment, a first given user of the two users experiences an issue with the other user and the method further comprises the first given user providing a notification of an issue to the third party using its smartphone.

In accordance with another embodiment, the method further comprises the users sharing data using their smartphones on the target prior performing the transfer of ownership.

In accordance with another broad aspect of the invention, there is disclosed a computer-readable storage medium storing computer-executable instructions which, when executed, cause a processing device to perform a method for estimating a position of a target using a plurality of smartphones, each smartphone being capable of communicating with the target over a limited wireless range, the method comprising receiving from a plurality of smartphones a corresponding plurality of identifications of the target to track together with corresponding time stamps and corresponding indications of the locations of the corresponding smartphone; storing the plurality of received identifications of the target to track together with the corresponding time stamps and the corresponding indications of the locations of the corresponding smartphones; filtering the stored plurality of received identifications of the target to track together with the corresponding time stamps and the corresponding indications of the locations of the corresponding smartphones to provide an estimation of a location of the target; and providing the estimation of the location of the target.

In accordance with another aspect of the invention, there is disclosed a target location estimation server, the target location estimation server comprising a display device; a central processing unit; a memory comprising a database for storing data and an application for determining an estimation of a position, wherein the application for determining an estimation of a position is stored in the memory and configured to be executed by the central processing unit, the application for determining an estimation of a position comprising instructions for receiving from a plurality of smartphones a corresponding plurality of identifications of the target to track together with corresponding time stamps and corresponding indications of the locations of the corresponding smartphone; instructions for storing the plurality of received identifications of the target to track together with the corresponding time stamps and the corresponding indications of the locations of the corresponding smartphones; instructions for filtering the stored plurality of received identifications of the target to track together with the corresponding time stamps and the corresponding indications of the locations of the corresponding smartphones to provide an estimation of a location of the target and instructions for providing the estimation of the location of the target.

An advantage of the method disclosed is that no expensive or extensive infrastructure is required for estimating a position of a target since a plurality of smartphones is used for that purpose. No network of receivers has to be built, deployed and maintained.

Another advantage of the method disclosed is that the target does not need to have a positioning system, such as a Global Positioning System (GPS) integrated with it or attached to it which is of great advantage from a power consumption point of view.

Another advantage of the method disclosed is the method involves a plurality of smartphones, and smartphones are now rapidly becoming ubiquitous. In fact, most smartphones now incorporate Bluetooth™, Wifi™ and GPS capability.

Another advantage of the method disclosed is that the cost of implementing and using it is low.

Another advantage of the method disclosed is that the degree of precision of the method may be high depending on a number of smartphones.

Another advantage of the method disclosed is that it may be easy to use it.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
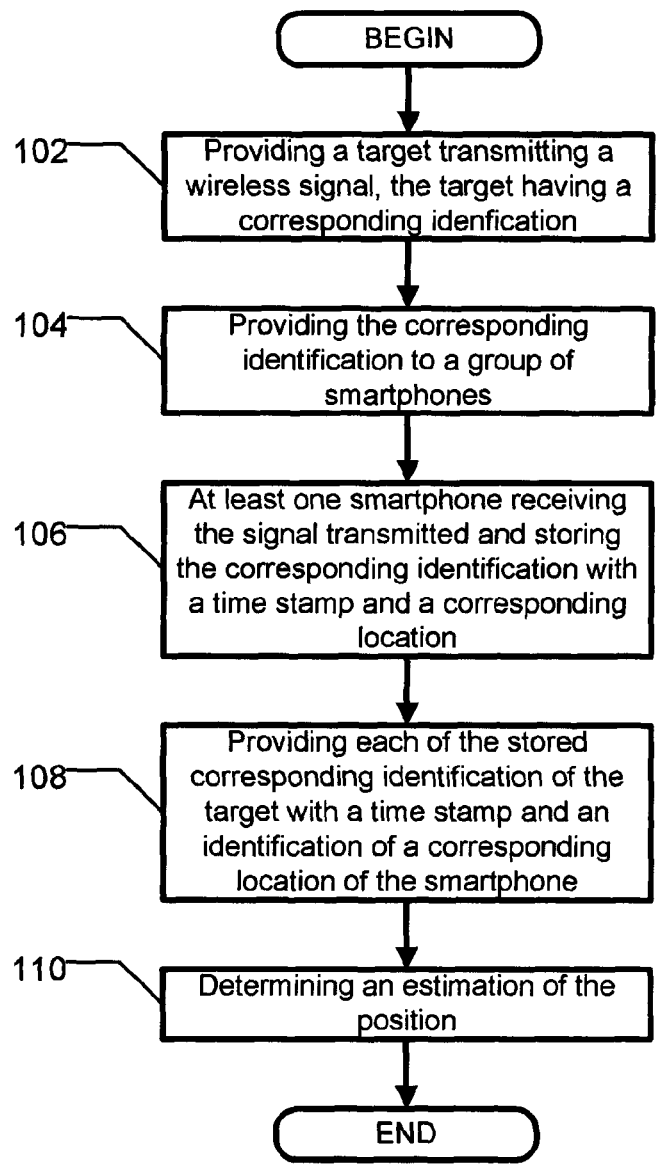
FIG. 1 is a flowchart which shows an embodiment of a method for estimating a position of a target using a plurality of smartphones.

Now referring to FIG. 1, there is shown an embodiment of a method for estimating a position of a target using a plurality of smartphones.

A target may be any item or object worth tracking. In particular, the item may be a car in one embodiment. Alternatively, the item may be an electronics device such as a computer, a tablet PC, etc. In fact and in one embodiment, the target may be any product that incorporates at least one of Bluetooth™ and Wifi™ capabilities. It will be appreciated that an object in contact with the target may also be tracked. So, for instance, a human wearing or carrying the target to track may be also tracked as a consequence, which may be of great advantage.

A smartphone may be defined as any device capable of communicating on a data network and also capable of executing at least one application.

The skilled addressee will appreciate that a plurality of smartphones is used in order to estimate of position of a target which is of great advantage since no expensive or extensive infrastructure is used in order to be able to estimate the position.

It will be appreciated that the smartphone is provided with a target location estimation application for enabling the performing of the method for estimating a position of a target using a plurality of smartphones as further explained below. The skilled addressee will appreciate that the target location estimation application may be provided to the smartphone according to various embodiments. In one embodiment, the target location estimation application is downloaded from an application store. In an alternative embodiment, the target location estimation application may be preloaded at an OEM level.

In one embodiment, the smartphone comprises a localization system or positioning system such as a Global Positioning System (GPS) receiver. In an alternative embodiment, the localization system is using a Wifi™ hotspot mapping or other means.

The method disclosed herein is of great advantage for estimating a position of the target using a plurality of smartphones as further explained below.

According to processing step 102, a target transmitting a wireless signal is provided. The target has a corresponding identification.

It will be appreciated that the wireless signal is a short-range wireless signal transmitted in accordance with a given communication standard. In one embodiment, the communication standard is Bluetooth™ wireless communication standard. In an alternative embodiment, the communication standard is Wifi™ wireless communication standard.

The corresponding identification may be any type of identification used for uniquely identifying the target.

In one embodiment, the corresponding identification comprises the media access control (MAC) address of the network interface used by the target for transmitting the wireless communication signal.

In an alternative embodiment, the corresponding identification comprises a modified media access control (MAC) address in a device where this feature is available, a unique ID number, a rolling code number, a descriptor, a caption or the like.

According to processing step 104, the corresponding identification of a target to track is provided to a group of smartphones.

It will be appreciated that the corresponding identification of a target to track may be provided in response to various types of event depending on an application sought, as explained further below.

Figure 5:
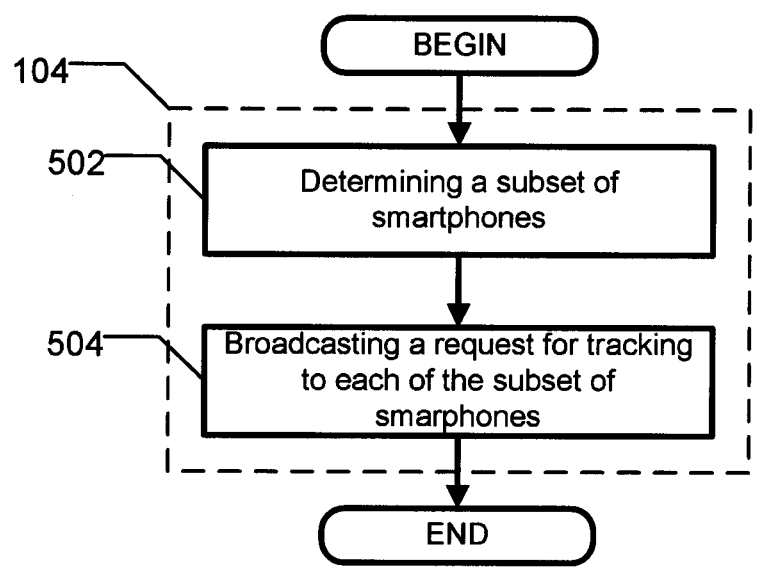
FIG. 5 is a flowchart which shows how an identification may be provided to a group of smartphones in one embodiment.

Now referring to FIG. 5, there is shown how the corresponding identification of the target to track is provided to a group of smartphones.

According to processing step 502, a subset of smartphones is determined.

It will be appreciated that the subset of smartphones may be determined in accordance to various criteria. For instance, the criteria may be selected from a group consisting of a determined rough estimation of a probable location of the target to track, a type of wireless communication signal supported by the target to track, a given group of users such as for instance, members from a law enforcement agency, employees from a given corporation, members of a club or an association, etc.

For instance, it will be appreciated that it may be possible to determine that the target may be located in any one of a given continent, a given country, a given region of a given country, a given city, a given district of a given city, etc.

It will be appreciated that the size of a given probable location of the target to track will potentially increase with time if no tracking is performed.

Moreover, it will be appreciated that determining a subset of smartphones may be used in order to limit unnecessary traffic and processing.

According to processing step 504, a request for tracking is broadcast to each of the subsets of smartphones.

More precisely, a request for tracking a given target will be received by each smartphone of the subset of smartphones. The request for tracking the given target will be received via the target location estimation application used for enabling the performing of the method for estimating a position of a target using a plurality of smartphones.

The target location estimation application will store the request in the memory of the smartphone in accordance with one embodiment. More precisely and in accordance with one embodiment, each request is received by the target location estimation application in the smartphone which will keep a list of all the targets to track. The skilled addressee will appreciate that the request may be stored according to various embodiments.

In one embodiment, the request comprises an identification of a target to track. The skilled addressee will appreciate that at least one parameter may be stored together with the identification of the target to track. For instance and in one embodiment, the at least one parameter may comprise at least one of a description of the target. The description may include a picture, a caption, model information, specifications, etc. It will be appreciated that the other parameter may also include an instruction such as a command to disable the target and also may be a command to turn the target off.

Now referring back to FIG. 1 and according to processing step 106, at least one smartphone receives the signal transmitted by the target and stores the corresponding identification of the target to track with a time stamp and an identification of a corresponding location of the smartphone. In one embodiment, the corresponding identification of the target to track is stored with the time stamp and the identification of a corresponding location by the target location estimation application of the smartphone.

It will be appreciated that the signal transmitted by the target may comprise various elements depending on a communication standard used. In fact, it will be appreciated that the identification of the target may be transmitted according to various embodiments. In one embodiment, the target is identified using the media access control (MAC) address of the network interface used by the target for transmitting the wireless signal. In an alternative embodiment, the corresponding identification comprises a modified media access control (MAC) address in a device where this feature is available, a unique ID number, a rolling code number, a descriptor, a caption or the like.

Accordingly and in the case where an identification received matches the identification of at least one target to track, the smartphone will temporarily store the corresponding identification target with a time stamp and an identification of a corresponding location of a smartphone. In one embodiment, the corresponding location of the smartphone will be obtained from the Global Positioning System (GPS) of the smartphone.

It will be appreciated that in an alternative embodiment additional information may be stored. The additional information may be selected from a group consisting of target status and user input information.

As mentioned earlier and in one embodiment, the corresponding identification target is stored with a time stamp and an identification of a corresponding location by the target location estimation application in the smartphone.

It will be appreciated that at this point the smartphone will have to provide the information to a remote identification server. In one embodiment, the providing of the information will be performed by the target location estimation application of the smartphone.

According to processing step 108, each of the stored corresponding identifications of the target is provided with the time stamp and an identification of a corresponding location of the smartphone. In accordance with one embodiment, a connection to the target location estimation server is made by the target location estimation application of the smartphone and information is provided using the connection. In one embodiment, the connection is made using one of TCP/IP, GPRS, CDMA, Bluetooth™ and Wifi™.

Figure 6:
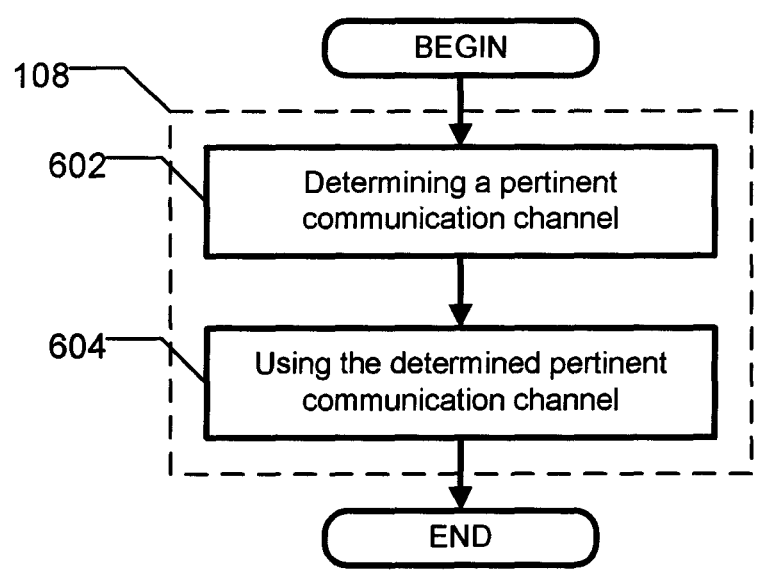
FIG. 6 is a flowchart which shows how each of the stored corresponding identifications of the target is provided with a time stamp and an identification of a corresponding location of the smartphone in one embodiment.

Now referring to FIG. 6, there is shown how each of the stored corresponding identifications of the target is provided in accordance with one embodiment.

According to processing step 602, a pertinent communication channel is determined.

In fact, it will be appreciated that various communication channels may be used for providing each of the stored corresponding identification of the target with the time stamp and an identification of a corresponding location of the smartphone to the target location estimation server.

In fact, a cellular data network may be used in one embodiment. In an alternative embodiment, another data network such as a Wifi™ may be used. In another embodiment, a smartphone to smartphone connection using Bluetooth™ may be performed.

It will be appreciated that the communication channel used may be determined according to at least one criterion such as a cost of the communication for instance and an availability of a given data network.

It will be appreciated however that the pertinence of the information obtained is highly dependent on time and more precisely the value of the information pertaining to the tracking decreases rapidly with time. It is therefore critical to transmit the data as soon as possible to the target location estimation server.

According to processing step 110, an estimation of the position of the target is determined.

The estimation of the position of the target is determined using at least one of the received time stamps associated with an identification of the target and the associated location of the smartphone.

In one embodiment, a filtering is performed and only recent data is used since as mentioned earlier the value of the data decreases rapidly with time.

Figure 2:
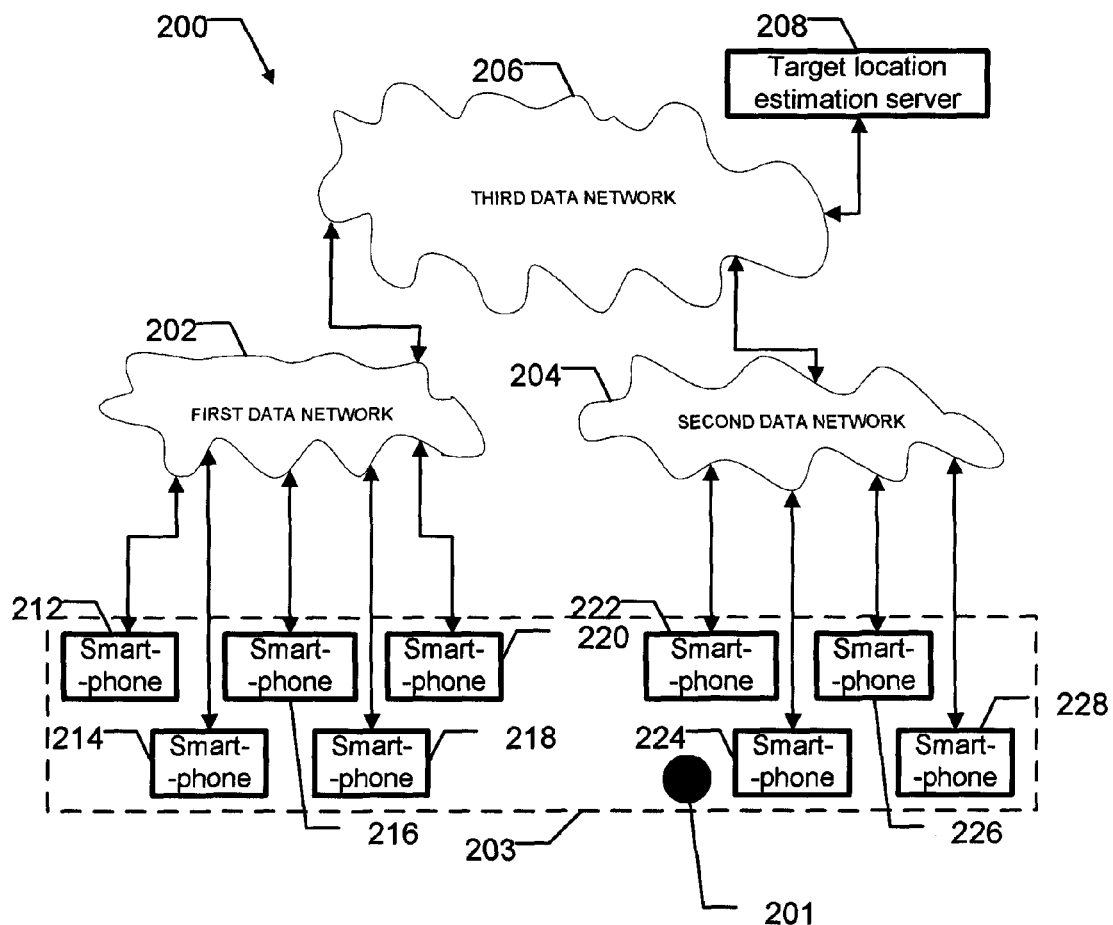
FIG. 2 is a diagram which shows an embodiment of a system for estimating a position of a target using a plurality of smartphones.

Now referring to FIG. 2, there is shown an embodiment of a system 200 for estimating a position of a target 201 using a plurality of smartphones 203.

In this embodiment, the system comprises a target location estimation server 208, and a plurality of smartphones 203.

The plurality of smartphones 203 comprises smartphones 212, 214, 216, 218, 220, 222, 224, 226, 228.

Still in this embodiment, smartphones 212, 214, 216, 218, 220 are operatively connected to a first data network 202.

It will be appreciated that the first data network 202 may be any type of data network. For instance, the data network 202 may be a cellular data network comprising any equipment required for implementing it.

Each smartphone of a second group of smartphones comprising smartphones 222, 224, 226, 228 is operatively connected to a second data network 204.

It will also be appreciated that the second data network 204 may be any type of network. For instance, each smartphone of the second group of smartphones comprising smartphones 222, 224, 226, 228 may be operatively connected to a second data network 204, using for instance a Wifi™ connection.

Still in the embodiment shown in FIG. 2, the target location estimation server 208 is operatively connected to a third data network 206.

It will be appreciated that the first data network 202, the second data network 204 and the third data network 206 may be operatively connected via gateways, as known by the skilled addressee.

Figure 3:
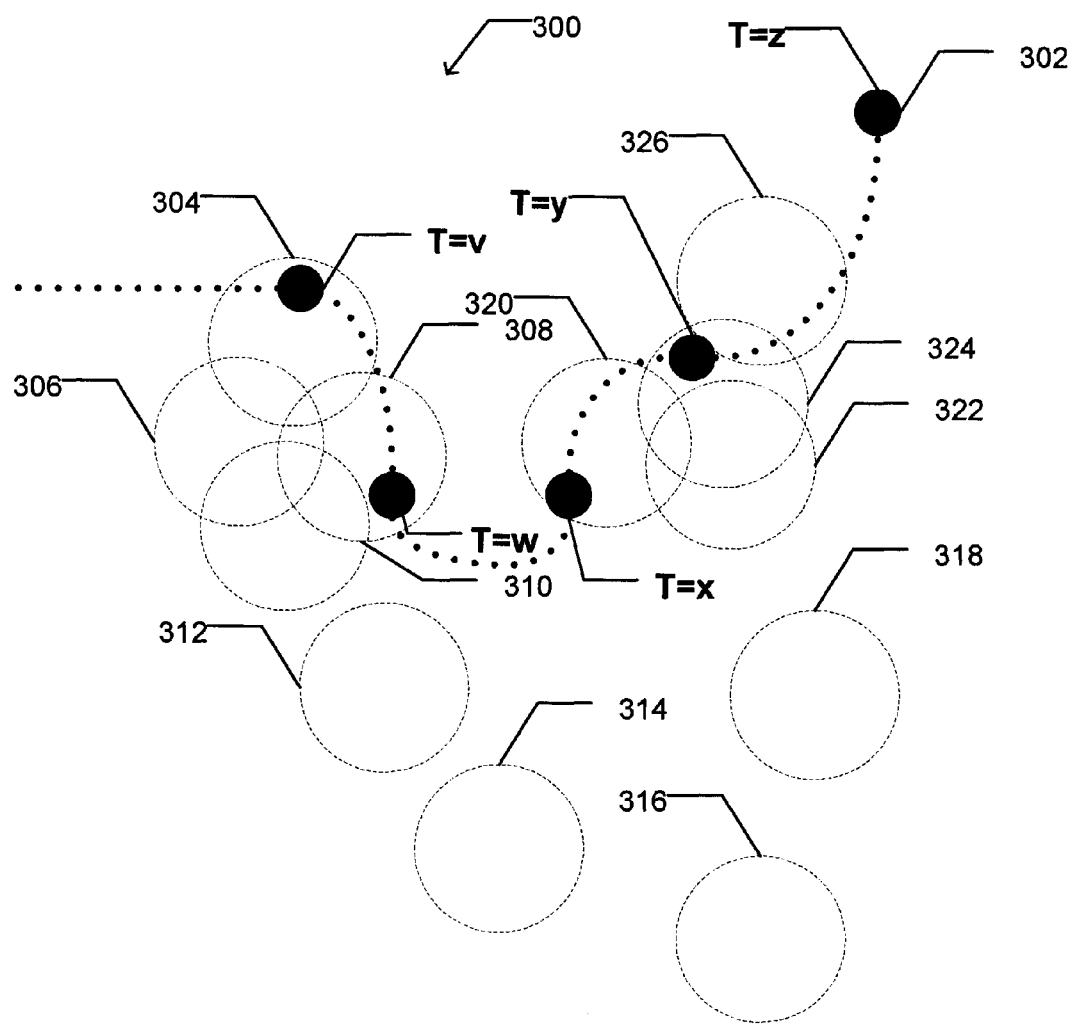
FIG. 3 is a schematic which shows an example of a movement of a target in a region comprising a plurality of smartphones.

Now referring to FIG. 3, there is shown a motion of a target 302 in the vicinity of a plurality of smartphones. It will be appreciated that each smartphone has a given coverage area for receiving a wireless signal.

In this particular case illustrated at FIG. 3, smartphones 304, 306, 308, 310, 312, 314, 316, 318, 320, 322, 324 and 326 are provided.

The skilled addressee will appreciate that while this figure describes, for sake of clarity, a static environment, i.e., each smartphone does not move with time, each smartphone may move since a user carrying it may also move. It will be therefore appreciated that a net or coverage area created by the smartphones may dynamically change which is of great advantage since it may reduce the likelihood of having permanent areas without coverage.

The skilled addressee will appreciate that the larger the number of smartphones is, the better it is for the purpose of estimating the location of the target.

As illustrated in FIG. 3, the target 302 will be located at various positions throughout time. At t=v, the target 302 will be in the coverage area of smartphone 304. At t=w, the target 302 will be in the coverage area of smartphone 308. At t=x, the target 302 will be in the coverage area of smartphone 320, and at t=y, the target 302 will be in the coverage area of smartphone 324. At t=z, the smartphone will not be in the coverage area of any smartphone.

It will be therefore appreciated that for t=v, t=w, t=x, and t=y, an estimation of the position of the target may be determined using the position of the corresponding smartphone being in the vicinity of the target to track.

The skilled addressee will appreciate that transmitting this estimation to the target location estimation server is of great advantage for the purpose of estimating the position of a target.

Figure 4:
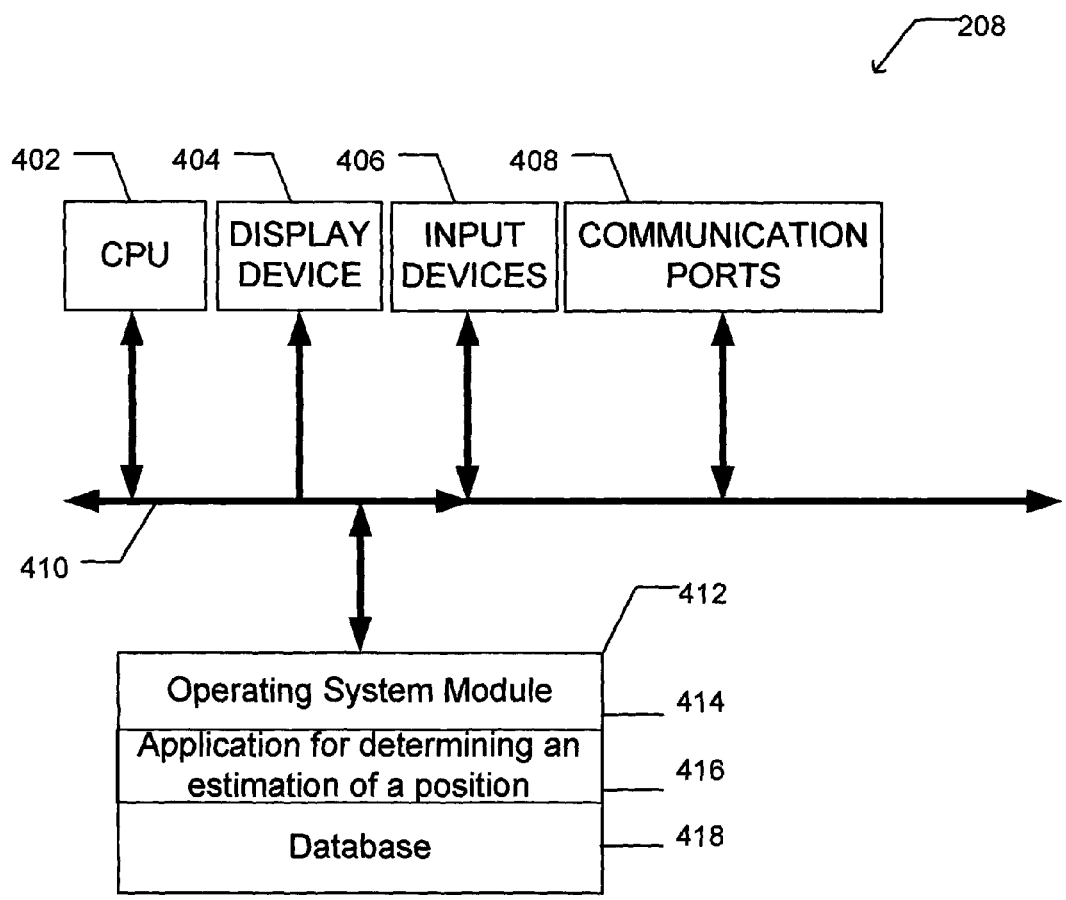
FIG. 4 is a diagram which shows an embodiment of a target location estimation server used for estimating a position of a target using a plurality of smartphones.

Now referring to FIG. 4, there is shown an embodiment of the target location estimation server 208 used for estimating a position of a target using a plurality of smartphones.

In this embodiment, the target location estimation server 208 comprises a central processing unit (CPU) 402, a display device 404, input devices 406, communication ports 408, a data bus 410 and a memory 412.

The central processing unit 402, the display device 404, the input devices 406, the communication ports 408 and the memory 412 are connected together using the data bus 410.

In one embodiment, the target location estimation server 208 is a regular IBM™ server.

In one embodiment, the Central Processing Unit 402 is manufactured by Intel™, is running at 2 GHz and is supporting 64 bits. The skilled addressee will appreciate that various alternative embodiments may be possible.

The display device 404 is used for providing a visual feedback to a user of the target location estimation server 208.

In one embodiment, the display device 404 comprises a regular LCD panel display. The skilled addressee will appreciate that various alternative embodiments may be provided for the display device 404.

The input devices 406 are used for enabling a user to provide data to the target location estimation server 208.

In one embodiment, the input devices 406 comprise a keyboard and a mouse. The skilled addressee will appreciate that various alternative embodiments may be possible for the input devices 406.

The communications ports 408 are used for enabling a communication between the target location estimation server 208 and other processing devices, as well as for enabling a communication between the target location estimation server 208 and a local device. In particular, the communications ports 408 are used for enabling a communication with each of the plurality of smartphones.

In one embodiment, the communication with the plurality of smartphones is achieved via at least one data network selected from a group consisting of local area networks (LAN), metropolitan area networks (MAN) and wide area networks (WAN). In one embodiment, the communication with the plurality of smartphones is achieved via at least the Internet.

The communications ports 408 may accordingly comprise for instance an Ethernet port and a Wifi™ port in one embodiment.

It will also be appreciated that the communications port may also comprise universal serial bus (USB) ports, a SD/SDHC card reader and HDMI port for the purpose of connecting the target location estimation server 208 with a local device.

The skilled addressee will again appreciate that various other embodiments may be provided for the communication ports 408.

The memory 412 is used for storing data.

In one embodiment, the memory 412 comprises a hard drive having a capacity of 500 GB.

More precisely and still in this embodiment, the memory 412 comprises, inter alia, an operating system module 414. The operating system module 414 is Windows™ manufactured by Microsoft™.

The memory 112 further comprises a database 418 comprising for each given target, a plurality of received identifications of a corresponding location of a smartphone and corresponding time stamps associated therewith.

The memory 112 further comprises an application for determining an estimation of a position 416. The application for determining an estimation of a position 416 is operatively coupled to the database 418.

More precisely, the application for determining an estimation of a position 416 comprises instructions for receiving for each given target, a plurality of received identifications of a corresponding location from a given smartphone and corresponding time stamps associated therewith.

The application for determining an estimation of a position 416 further comprises instructions for storing in the database for each given target the plurality of received identifications of a corresponding location from a given smartphone and corresponding time stamps associated therewith in the database 418.

The application for determining an estimation of a position 416 further comprises instructions for computing and displaying on the display device 404 an indication of an estimation of a location of a given target.

It will be appreciated by the skilled addressee that the computing of the estimation of a location of a given target may be performed according to various embodiments. In one embodiment, the estimation is computed by providing a most recent indication of a location of a smartphone which has detected the given target.

In an alternative embodiment an interpolation is performed using a plurality of indications of locations over time to determine a probable path for the given target.

As mentioned earlier, the skilled addressee will appreciate that the target does not need to have a positioning system, such as a Global Positioning System (GPS) coupled to it which is of great advantage since the skilled addressee will appreciate that a Global Positioning System may consume an amount of energy which is not suitable for use in a self-contained and autonomous device.

Figure 7:
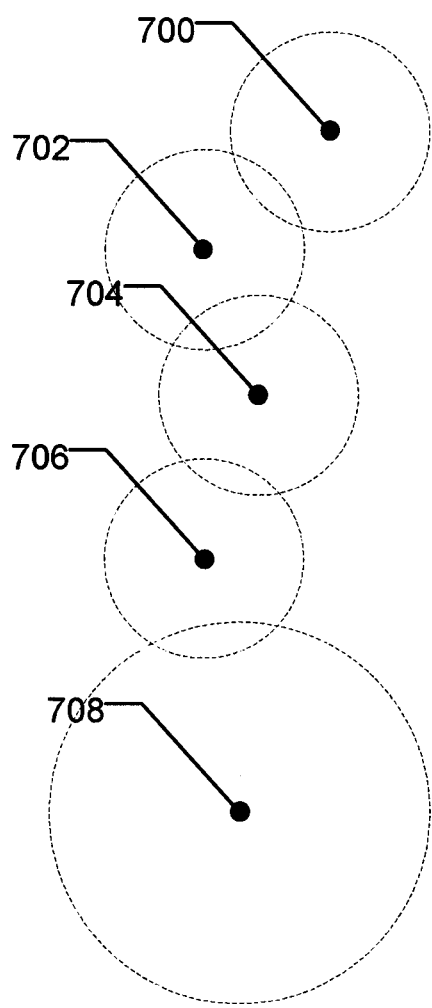
FIG. 7 is a diagram which illustrates a method for increasing an operating range of the method for estimating a position of a target using a plurality of smartphones.

As illustrated in FIG. 7, it will be appreciated that the operating range of the method disclosed above may be advantageously increased.

For instance in the embodiment disclosed in FIG. 7, target 700 will not be detected directly by smartphone 708 since the target 700 is too far away from the smartphone 708.

In such embodiment intermediary processing devices 702, 704 and 706 may be advantageously used. Each of the intermediary processing devices 702, 704 and 706 is adapted to receive the identification of any target located in its respective operating range. Each intermediary processing device is also adapted to receive any communication from any intermediary processing device. Each intermediary processing device is also adapted to send received information with or without being prompted to do so to any intermediary processing device in its operating range and to any smartphone in its operating range.

In one embodiment, the data is transmitted by the intermediary processing device with additional data such as for instance, an intermediary processing device identification, a time stamp, etc.

In fact, it will be appreciated that data being retransmitted by an intermediary processing device can also be encoded with information indicating the age, generation or instance of the retransmission. For instance, intermediary processing device number 1234 having received information from intermediary processing device 6524 will then retransmit 1234 and then 6524 and (1) since it is being (re-transmitted) for a second time. Subsequently other intermediary processing devices will send their respective id followed by the other id numbers received along with (2 3 or 4 . . . ) indicating whether they are the second, third or fourth intermediary processing device to have received id #6524. It will be appreciated that indicating the age, generation, repetition level or instance number can significantly help to improve accuracy and or the relevance of positioning information and or position approximation.

It will also be appreciated that the information may not be transmitted in certain cases. For instance, the information may not be transmitted after a certain period of time, i.e., after a certain period of time between the detection of the target 700 and the detection by a given intermediary processing device.

For instance and still referring to FIG. 7, intermediary processing device 702 will detect the identification of the target 700 and it will transmit it to any surrounding intermediary processing device, i.e., intermediary processing device 704 which will in turn receive the identification of the target 700 and transmit it to intermediary processing device 706, which will transmit it in turn to smartphone 708.

The skilled addressee will appreciate that in one embodiment, targets may be provided with intermediary processing device integrated within. The skilled addressee will appreciate that this may be of great advantage.

Using intermediary processing devices to extend the range of operation is of great advantage for various reasons. For instance, this may be advantageous when starting the deployment of the system disclosed herein, i.e., when a number of smartphones participating in the system is limited. Also, it will be appreciated that in certain cases there may be some areas in which the probability of finding a smartphone is very low. Using intermediary processing devices in those areas may therefore be of great advantage. It will also be appreciated that using this method is also of great advantage in the case where Bluetooth™ communication standard is used by the target since the operating range of Bluetooth™ is known to be limited.

It will be appreciated that the intermediary processing device may be implemented according to various embodiments. In one embodiment, the intermediary processing device comprises a Bluetooth™ transceiver operatively coupled to a memory and to a central processing unit.

It will be appreciated that the method disclosed herein may be used in various applications.

For instance, the method disclosed herein may be used for obtaining an indication of a probability that a given item has been stolen.

Figure 8:
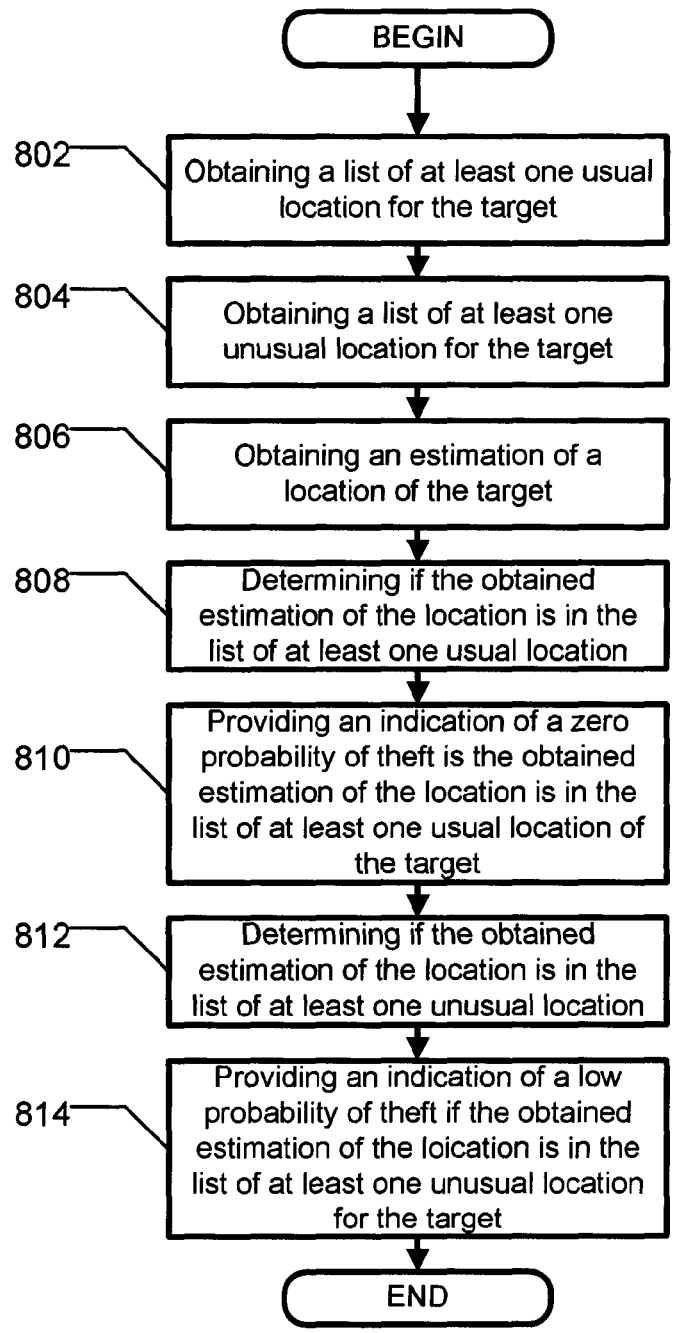
FIG. 8 is a flowchart which shows an embodiment of a method for obtaining an indication of a probability that a given item has been stolen.

Now referring to FIG. 8, there is shown an embodiment of a method for obtaining an indication of a probability that a given item has been stolen.

According to processing step 802, a list of at least one usual location for the target is obtained.

According to processing step 804, a list of at least one unusual location for the target is obtained.

According to processing step 806, an estimation of a location of the target is obtained using the method disclosed above.

According to processing step 808, a test is performed in order to determine if the obtained estimation of the location is in the list of at least one usual location for the target.

According to processing step 810, an indication of a zero probability of theft is provided if the obtained estimation of the location is in the list of at least one usual location for the target.

According to processing step 812, a test is performed in order to determine if the obtained estimation of the location is in the list of at least one unusual location for the target.

According to processing step 814, an indication of a low probability of theft is provided if the obtained estimation of the location is in the list of at least one unusual location for the target.

It will be appreciated that, in one embodiment, the probability or likelihood that the item has been stolen may be rated according to one of three possible ratings. The skilled addressee will appreciate that another number of ratings may be provided in an alternative embodiment.

A first rating may be associated with a zero probability that the item has been stolen. This rating may be assigned when it is noticed that the item is located at usual locations.

A second rating may be associated with a low probability that the item has been stolen. This rating may be assigned in the case for instance where the item is at an unusual location or at a location known for having a high risk for theft.

A third rating may be associated with a high probability that the item has been stolen. This rating may be assigned when the item is identified as being stolen or cannot be located anymore for a given period of time.

Being able to determine an estimation over time of a location of an item will therefore be of great advantage in order to determine location of the item over time, usual locations, a profile associated with a given location (i.e., if a location is or becomes notoriously known for theft or not), known recovery and or theft areas, etc.

This application may be provided using a theft probability indication providing server which will be used for the purpose of implementing a method for obtaining an indication on the probability that a given item has been stolen.

In this embodiment, the theft probability indication providing server is operatively coupled to the target location estimation server and obtains estimations of a position of a given target (i.e., an item) over time from the target location estimation server. In an alternative embodiment, the theft probability indication providing server is integrated in the target location estimation server.

It will be appreciated that the theft indication providing server may comprise a database comprising present and past locations of the item and description of all known serial numbers of the item, owner information which can also include pictures of the item, detailed description entered during a registration.

The database of the theft probability indication providing server may further comprise additional data such as locations of all past queries, locations of where the owner has left the item (if known and determined using the smartphone of the owner of the item) as well as past inquiry results.

It will then be appreciated that after accessing the theft probability indication providing server, a user may readily find out which of the three ratings apply for a given item. The theft probability indication providing server may be accessed using a dedicated application running on a processing device such as a smartphone, a tablet PC, a desktop computer or the like. In one embodiment, the theft probability indication server is accessed by a user via its smartphone over a data network and a corresponding result is obtained on it.

It will be appreciated that various types of user may access the theft probability indication providing server and perform a request for obtaining the indication. For instance and in one embodiment, the user may be a law enforcement officer who wants to have an idea of the status of a given item, such as for instance a car. In such embodiment, the law enforcement officer could access the theft probability indication providing server with an identification of the item, such as the plate in the case where the item is a car. A corresponding result could then be provided back to the law enforcement officer. The corresponding result could be anyone of the three ratings.

It will also be appreciated by the skilled addressee that the type of information provided back to the user may depend on a type of user.

For instance, a law enforcement officer may have access to all data including personal data associated with the item and the owner of the item.

A regular user may have only access for instance to the description of the item.

Another type of user may only have access to the rating associated with a given item. This type of user may be users involved in the resale of used items such as for instance pawn shop owners.

It will again be appreciated that the access may be offered to a user according to various embodiments.

It will be appreciated that in an alternative embodiment, an alert messaging system may be implemented for a given item. The alert messaging system may be provided, for instance for a fee, to a user which may be the owner of the item in one embodiment.

In such embodiment, the user would first register its item by accessing the theft probability indication providing server and providing data associated with the item such as for instance an identification of the item, etc. The theft probability indication providing server may be accessed using a dedicated application running on a processing device such as a smartphone, a tablet PC, a desktop computer or the like. In one embodiment, the theft probability indication server is accessed by a user via its smartphone.

The theft probability indication providing server would then access the target location estimation server with the identification of the item to track. In return, the target location estimation server would then provide at regular intervals an estimation of a location of the item to the theft probability indication providing server. The theft probability indication providing server would then determine a rating depending on the estimation of the location of the item provided.

When a change of rating is detected by the theft probability indication providing server, the user could then be provided with a notification. In one embodiment, the notification is provided by email. In an alternative embodiment, the notification is provided using a short message system (SMS) message. In an alternative embodiment, the notification is provided with a voicemail. In one embodiment, the notification is provided by at least one of a short message system (SMS) message and an application push notification.

It will be appreciated that in response, the user may request an indication of the estimation of the position of the item by sending a request to the theft probability indication providing server. In return, the user would then obtain the last estimation of the position of the item if available.

The skilled addressee will appreciate that this may be of great advantage in order for an owner to be notified of any potential change in the ownership condition of an item.

It will be appreciated that the alert messaging system may be provided according to various embodiments. In one embodiment, the user may access the alert messaging system for a fee. In one embodiment the alert messaging system may access the alert messaging system in exchange of a participation to the alert messaging system, i.e., in exchange for the user to download and execute the application on its smartphone for enabling its smartphone to be amongst the plurality of smartphones operatively connected to the target location estimation server.

It will be also appreciated that while in one embodiment, the information may be provided at a requested time, alternatively the information may be provided back with updates for a given period of time which may be of great advantage.

It will be appreciated that the method disclosed above may be also used for providing an automatic inventory system.

Figure 9:
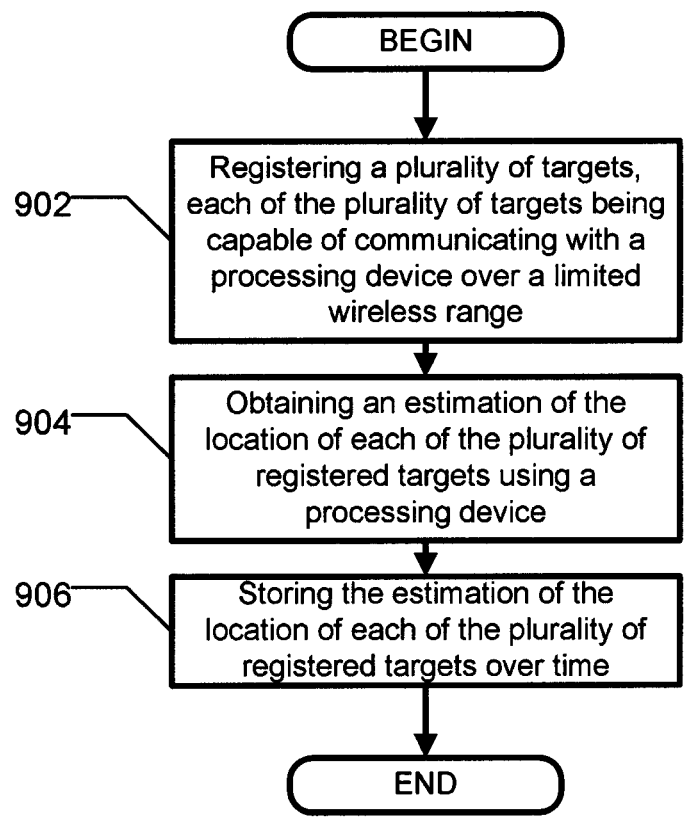
FIG. 9 is a flowchart which shows an embodiment of a method for providing an automatic inventory system.

Now referring to FIG. 9, there is shown an embodiment of a method for providing an automatic inventory system.

According to processing step 902, a plurality of targets is registered. Each of the plurality of targets is capable of communicating with a processing device over a limited wireless range. It will be appreciated that the processing device may be a smartphone in one embodiment. Alternatively, the processing device may be a desktop computer, etc.

According to processing step 904, an estimation of the location of each of the plurality of registered targets is obtained using a processing device.

According to processing step 906, the estimation of the location of each of the plurality of registered targets is stored over time.

More precisely, it will be appreciated that the automatic inventory system may be provided using an inventory system server.

In this embodiment, the inventory system server is operatively coupled to the target location estimation server and obtains estimations of a position of a given item (also referred to as target) over time from the target location estimation server. In an alternative embodiment, the inventory system server is integrated with the target location estimation server.

The inventory system server may comprise a database comprising present and past locations of the target and description of all known serial numbers of the target, owner information which can also include pictures of the target, detailed description entered during a registration.

Still in this embodiment, the smartphone of a user may be used to identify targets in its vicinity by scanning and looking for potential new targets. In order to participate, the smartphone may be provided with an automatic inventory system application. It will be appreciated that the automatic inventory system application is operatively coupled to the inventory system server.

While running the automatic inventory system application, the smartphone of the user may detect a plurality of potential targets and invite the user via the user interface of the automatic inventory system application of the smartphone to confirm if he/she wants to register at least one new target.

It will be appreciated that the detection may be performed by detecting an identification transmitted by a target and received by the smartphone.

It will also be appreciated that in the case where the identification of the target comprises a media access control (MAC) address, it may be possible to even detect a type of target or a manufacturer of the target. This may be advantageously used in order for the user to readily understand which target has been detected.

In the case where the user accepts to register the target, the automatic inventor system application will associate the identification of the target to register to the user. It will be appreciated that the information may be stored locally, i.e., in the smartphone, or at a remote location, such as for instance at the inventory system server.

The skilled addressee will appreciate that this application may be of great interest, for instance, at the office or at home. Still in this embodiment, the user may be notified via the smartphone or via other means if a target is not detected anymore at a given location or in a surrounding given location. In one embodiment, the detection may be performed at regular time. It will be appreciated that the smartphone of the user may be used by the target location estimation server in one embodiment. In an alternative embodiment, a plurality of smartphones located in the surrounding of the area where the target is supposed to be may be used by the target location estimation server, this may be viewed as an invisible electronic fence.

The skilled addressee will appreciate that this method may be of great advantage for monitoring purposes. This may also give a hint to a user that an item has been lost, stolen, sold or is not functioning properly which is of great advantage via the automatic inventory system application.

It will be appreciated that the method for estimating a position of a target using a plurality of smartphone disclosed herein may be alternatively used for theft prevention.

Figure 10:
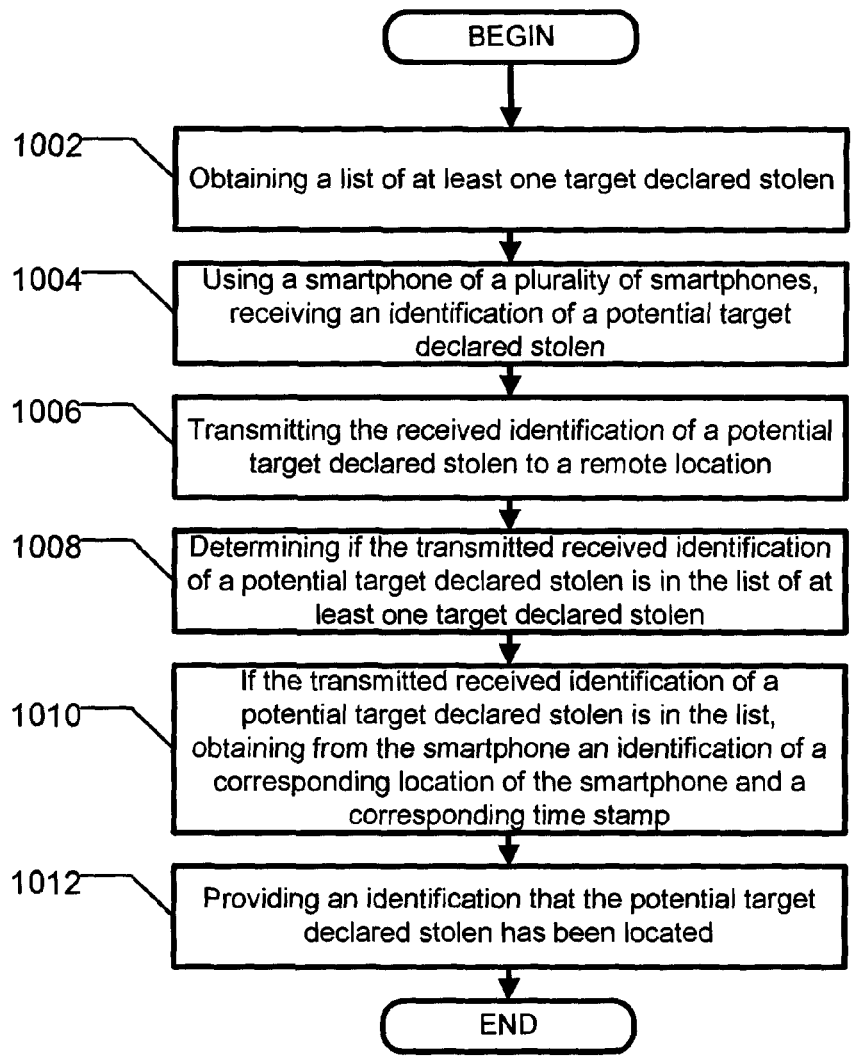
FIG. 10 is a flowchart which shows an embodiment of a method for preventing theft of a target using a plurality of smartphones.

Now referring to FIG. 10, there is shown an embodiment of a method for preventing theft of a target using a plurality of smartphones.

According to processing step 1002, a list of at least one target declared stolen is obtained. It will be appreciated that the list of at least one target declared stolen may be obtained according to various embodiments.

According to processing step 1004, an identification of a potential target declared stolen is received using a smartphone of a plurality of smartphones.

According to processing step 1006, the received identification of a potential target declared stolen is transmitted to a remote location.

According to processing step 1008, a determination is performed in order to find out if the transmitted received identification of a potential target declared stolen is in the list of at least one target declared stolen.

According to processing step 1010, an indication of a corresponding location of the smartphone and a corresponding timestamp are obtained from the smartphone if the transmitted received identification of a potential target declared stolen is in the list of at least one target declared stolen.

According to processing step 1012, an indication that the potential target declared stolen has been located is provided.

In this embodiment, a target, such as a laptop for instance, identifies itself using its media access control (MAC) address and Service Set Identifier (SSID) which is wirelessly broadcast. This may be used advantageously to warn surrounding users that it has been registered to a given owner.

It will be appreciated that when users are in proximity of a device (also referred to as a target) which has been declared stolen or lost, the user may be notified and alerted of the presence of the stolen or lost device via a notification application running on their smartphones or their PC. This may seriously deter thieves from using stolen devices in public areas.

In such embodiment, the notification application is operatively coupled to a notification server. The notification server is operatively coupled to the target location estimation server. In one embodiment, the notification application will transmit detected item identifications received by the smartphone running the notification application to the notification server. The notification server comprises a database of devices declared stolen. It will be appreciated that this database may be populated by legitimate users, law enforcement agencies, etc. In return, the notification server will provide an indication that the device has been or not stolen back to the smartphone of a surrounding user. It will be appreciated that in the case where the device has been stolen, the notification server may further send an estimation of the position of the device to the target location estimate server in order to update the last position if applicable.

It will be appreciated that the surrounding user may further receive additional item details such as a description, a model, a picture, etc. The additional item data may be stored in the database of devices declared stolen.

It will be appreciated that the smartphone running the notification application locating the device may also be able to send further data back to the notification server. The skilled addressee will appreciate that this application may be of great advantage for law enforcement agencies as well as for device owners.

It will be appreciated that in one embodiment repetitive warning messages may be prevented. Once a warning has been provided to the user of a smartphone, it is logged and the user of the smartphone will not be reminded for a predetermined amount of time.

It will be appreciated that one advantage of the methods disclosed herein is that it does not require any adding of hardware or software on the device. In fact, in many instances OEM Bluetooth™ or Wifi™ is implemented and available on the device which is of great advantage. For instance many recent cars now integrate Bluetooth™.

It will also be appreciated that when implementing a method disclosed herein, incentives/rewards may be given to the users of the smartphones involved in the discovery of a target. The incentive/rewards may be dependent on the value of the target or may be based on time. For instance, a reward may increase or decrease over time.

Various types of users may be involved and affiliate programs may also be provided for enabling a given user to obtain a split of any gain obtained by another user being involved in the discovery of the target in the case where the other user has been introduced to the system by the given user.

While a couple of applications have been described, it will be appreciated by the skilled addressee that those applications may be integrated into a single application.

Also it will be appreciated that many features may be integrated in the application running on the smartphone such as receptions of alert notices, requests for recruiting additional users having a smartphone, etc.

It will be further appreciated that the method for estimating a location of a target using a plurality of smartphones may be also used for enabling a meeting between two users for the purpose of safely transferring the ownership of an item (also referred to as a target). In this embodiment, a third party may be involved in order to make sure everything goes smoothly.

This meeting may occur once a user finds out an item and wishes to bring it back to the legitimate owner.

The user who desires to bring back the item and the legitimate owner will both have a smartphone with a meeting application running on it. The third party will also have a processing unit running an application operatively connected to the meeting application of each of the two users.

Via the meeting application, the user who desires to bring back the target will provide all pertinent user information to the legitimate owner. The pertinent user information may also be provided to the third party via its application.

Figure 11:
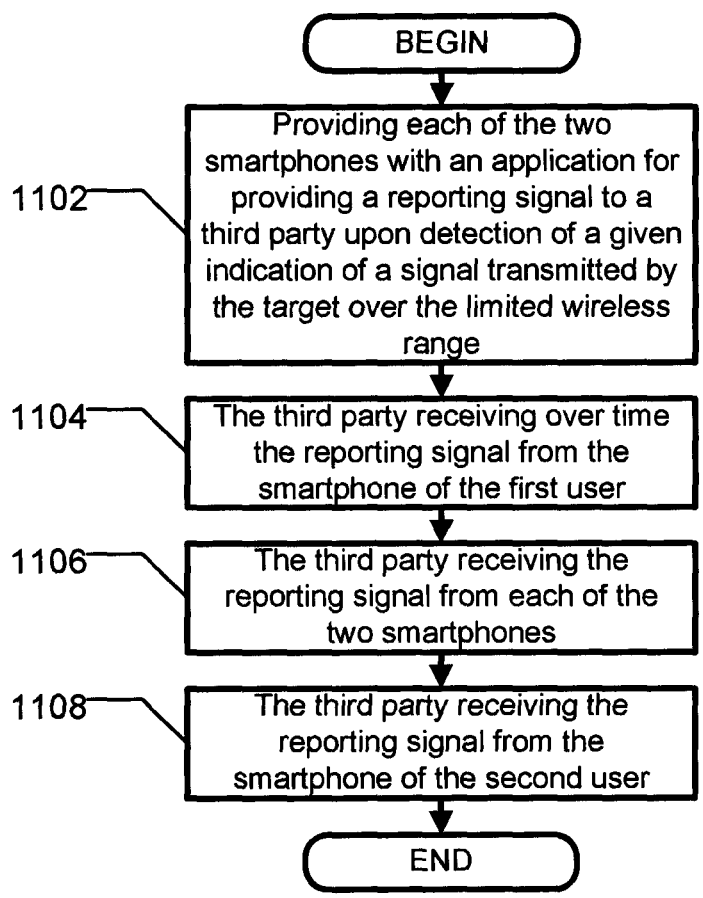
FIG. 11 is a flowchart which shows an embodiment of a method for enabling a third party to monitor a transfer of ownership of a target between a first user and a second user.

Now referring to FIG. 11, there is shown an embodiment of a method for enabling a third party to monitor a transfer of ownership of a target between a first user and a second user, each of the first user and the second user carrying a corresponding smartphone capable of communicating with the target over a limited wireless range.

According to processing step 1102, each of the two smartphones is provided with an application for providing a reporting signal to a third party upon detection of a given indication of a signal transmitted by the target over the limited wireless range.

According to processing step 1104, the third party receives over time the reporting signal from the smartphone of the first user.

According to processing step 1106, the third party receives the reporting signal from each of the two smartphones.

According to processing step 1108, the third party receives the reporting signal from the smartphone of the second user.

It will be appreciated that, for instance, a picture of the user involved in the recovery of the item may be provided in order to facilitate the meeting.

Using the target location estimation server and the meeting application running on each of the two smartphones and the third party application, the third party will be able to track a physical change of ownership of the item and make sure everything occurs according to a given protocol.

In the case of an issue, a request for an update may be provided to anyone of the two users involved in the transfer of ownership. The request for an update may comprise a notification provided on the meeting application running on each of the two smartphones. Alternatively, a notification of an issue may alternatively provided to a third party in case a user experiences an issue.

The skilled addressee will appreciate that this may be of great advantage for the purpose of the increasing the safety of a meeting between strangers.

Clause 1. A method for estimating a position of a target using a plurality of smartphones, each smartphone being capable of communicating with the target over a limited wireless range, the method comprising:

providing a target transmitting a wireless signal having a corresponding identification for uniquely identifying the target;

providing the corresponding identification of the target to track to a group of smartphones;

each smartphone of the group of smartphones being capable of receiving the signal transmitted if the target is in its vicinity and storing the corresponding identification of the target with a time stamp and an indication of a corresponding location of the smartphone;

obtaining each of the stored corresponding identification of the target with a time stamp and an indication of a corresponding location of the smartphone to thereby estimate a position of the target.

Clause 2. The method as claimed in clause 1, wherein each of the plurality of smartphones comprises a localization system.

Clause 3. The method as claimed in clause 2, wherein the localization system comprises at least one of a Global Positioning System (GPS) receiver and a Wifi™ hotspot mapping system.

Clause 4. The method as claimed in any ones of clauses 1 to 3, wherein the wireless signal is a short-range wireless signal.

Clause 5. The method as claimed in clause 4, wherein the short-range wireless signal is transmitted according to a communication standard selected from a group consisting of Bluetooth™ and Wifi™.

Clause 6. The method as claimed in any ones of clauses 1 to 5, wherein the corresponding identification comprises a medium access control (MAC) address used by the target for transmitting said wireless communication signal.

Clause 7. The method as claimed in any ones of clauses 1 to 5, wherein the identification for uniquely identifying the target comprises a modified medium access control (MAC) address.

Clause 8. The method as claimed in any ones of clauses 1 to 7, wherein the providing of the corresponding identification of the target to track to a group of smartphones comprises determining a subset of smartphones and broadcasting a request for tracking the target to each smartphone of the subset of smartphones.

Clause 9. The method as claimed in clause 8, wherein the determining of the subset of smartphones is performed according at least one criterion.

Clause 10. The method as claimed in clause 9, wherein the at least one criterion is selected from a group consisting of a determined rough estimation of a probable location of the target to track, a type of wireless communication signal supported by the target to track, a given group of users.

Clause 11. The method as claimed in any ones of clauses 8 to 10, wherein the request for tracking the target comprises an identification of the target to track and at least one other parameter.

Clause 12. The method as claimed in clause 11, wherein the at least one other parameter comprises at least one of a description of the target, a command to disable the target and a command to turn the target off.

Clause 13. The method as claimed in clause 12 wherein the description of the target comprises at least one of a picture, a caption, model information and specification.

Clause 14. The method as claimed in any one of clauses 1 to 13, further comprising receiving a list of at least one target to track; further determining if the corresponding identification of the target matches the list of at least one target to track and performing said storing if the corresponding identification of the target matches the list.

Clause 15. The method as claimed in any ones of clauses 1 to 14, further comprising storing additional information selected from a group consisting of a target status and a user input information.

Clause 16. The method as claimed in any one of clauses 1 to 15, wherein the obtaining of each of the stored corresponding identification of the target with a time stamp and an indication of a corresponding location of the smartphone comprises receiving each of the stored corresponding identifications of the target with a corresponding time stamp and a corresponding indication of a location of the smartphone and filtering the stored corresponding identifications of the target using the corresponding time stamps to remove the stored corresponding identifications of the target having corresponding time stamps older than a given value and the stored corresponding indications of a location for which the corresponding time stamps are older than a given value.

Clause 17. The method as claimed in any ones of clauses 1 to 16, wherein the obtaining of each of the stored corresponding identification of the target with a time stamp and an identification of a corresponding location of the smartphone comprises determining a pertinent communication channel for transmitting each of the stored corresponding identification of the target with a time stamp and an identification of a corresponding location of the smartphone.

Clause 18. The method as claimed in clause 17, wherein the determining is performed according to at least one criterion selected from a group comprising cost and availability.

Clause 19. The method as claimed in clause 17, wherein the pertinent communication channel is selected from a group consisting of Wifi™, Bluetooth™ and a cellular data network.

Clause 20. A method for estimating a position of a target using a plurality of smartphones, each smartphone being capable of communicating with the target over a limited wireless range, the method comprising:

receiving from a plurality of smartphones a corresponding plurality of identifications of the target to track together with corresponding time stamps and corresponding indications of the locations of the corresponding smartphone;

storing the plurality of received identifications of the target to track together with the corresponding time stamps and the corresponding indications of the locations of the corresponding smartphones;

determining an estimation of the location of the target using the stored plurality of received identifications of the target to track together with the corresponding time stamps and the corresponding indications of the locations of the corresponding smartphones; and providing the determined estimation of the location of the target.

Clause 21. A method for obtaining an indication of a probability that a target has been stolen, the method comprising:

obtaining a list of at least one usual location for the target;

obtaining a list of at least one unusual location for the target;

obtaining an estimation of a location of the target using the method as claimed in claim 1;

determining if said obtained estimation of the location is in the list of at least one usual location for the target;

providing an indication of a zero probability of theft if said obtained estimation of the location is in the list of at least one usual location for the target;

determining if said obtained estimation of the location is in the list of at least one unusual location for the target; and providing an indication of a low probability of theft if said obtained estimation of the location is in the list of at least one unusual location for the target.

Clause 22. The method as claimed in clause 21, wherein the estimation of the location of the target is obtained over a given period of time; further providing an indication of a high probability of theft if no estimation of the location of the target is obtained for the given period time.

Clause 23. The method as claimed in clause 21, further comprising obtaining the estimation of the location of the target over a given period of time; wherein the obtaining of the estimation of the location of the target over a given period of time is performed in response to a request from a user.

Clause 24. The method as claimed in clause 23, wherein the request from a user is transmitted over a data network using a smartphone.

Clause 25. The method as claimed in clause 24, wherein the request from the user comprises an identification of the target; further wherein the indication of a probability is provided to the smartphone of the user transmitting the request.

Clause 26. The method as claimed in clause 24, further comprising detecting a change in the indication of a probability over time and providing a notification to the user upon detection of the change in the indication of a probability.

Clause 27. The method as claimed in clause 26, wherein the providing of the notification comprises at least one of sending a short message system (SMS) message to the user and providing a voicemail to the user.

Clause 28. The method as claimed in clause 26, wherein the notification is provided to the user for a fee.

Clause 29. The method as claimed in clause 26, wherein the notification is provided to the user if the smartphone of the user is one of the plurality of smartphones being capable of communicating with the target over a limited wireless range.

Clause 30. A method for providing an automatic inventory system to a user, the method comprising:

registering a plurality of targets, each of the plurality of targets being capable of communicating with a processing device over a limited wireless range;

obtaining an estimation of the location of each of the plurality of registered targets using a processing device;

storing the estimation of the location of each of the plurality of registered targets over time.

Clause 31. The method as claimed in clause 30, wherein the registering of the plurality of targets comprises detecting a plurality of potential targets around the user using a smartphone of the user and inviting the user to register at least one new target.

Clause 32. The method as claimed in clause 31, wherein the detecting of a plurality of potential targets around the user is performed using a media access control (MAC) address.

Clause 33. The method as claimed in any ones of clauses 31 to 32, wherein the registering of the plurality of targets comprises receiving from the user registering a given target at least one of a serial number of the target, owner information for the target and a detailed description of the target.

Clause 34. The method as claimed in any ones of clauses 31 to 33, wherein the registering comprises associating the at least one new target to the user performing the registration.

Clause 35. The method as claimed in any ones of clauses 30 to 34, wherein the obtaining of an estimation of the location of each of the plurality of registered targets is performed at regular intervals, further comprising determining if the estimation of the location has changed over time and providing a notification to the user.

Clause 36. A method for preventing theft of a target using a plurality of smartphones, each smartphone being capable of communicating with the target over a limited wireless range, the method comprising:

obtaining a list of at least one target declared stolen;

using a smartphone of a plurality of smartphones, receiving an identification of a potential target declared stolen;

transmitting the received identification of a potential target declared stolen to a remote location;

determining if the transmitted received identification of a potential target declared stolen is in the list of at least one target declared stolen;

if the transmitted received identification of a potential target declared stolen is in the list of at least one target declared stolen;

obtaining from the smartphone an indication of a corresponding location of the smartphone and a corresponding timestamp;

providing an indication that the potential target declared stolen has been located.

Clause 37. The method as claimed in clause 36, wherein the indication that the potential target declared stolen has been located is provided to at least one of the smartphone and a third party.

Clause 38. The method as claimed in clause 37, wherein the indication that the potential target declared stolen has been located is provided to the smartphone, further comprising providing additional data to at least one of the smartphone.

Clause 39. The method as claimed in clause 38, wherein the additional data comprises at least one of a description of the target, an indication of a model of the target and a picture of the target.

Clause 40. The method as claimed in any one of clauses 36 to 39, further comprising providing an incentive to a user of the smartphone.

Clause 41. The method as claimed in clause 40, further comprising modifying a value of the incentive over time.

Clause 42. The method as claimed in any ones of clauses 40 to 41, wherein the providing of the incentive to a user comprises splitting the incentive between a plurality of users.

Clause 43. A method for enabling a third party to monitor a transfer of ownership of a target between a first user and a second user, each of the first user and the second user carrying a corresponding smartphone capable of communicating with the target over a limited wireless range, the method comprising:

providing each of the two smartphones with an application for providing a reporting signal to a third party upon detection of a given indication of a signal transmitted by the target over the limited wireless range;

the third party receiving over time the reporting signal from the smartphone of the first user;

the third party receiving the reporting signal from each of the two smartphones; and the third party receiving the reporting signal from the smartphone of the second user.

Clause 44. The method as claimed in clause 43, wherein a first given user of the two users experiences an issue with the other user, further comprising the first given user providing a notification of an issue to the third party using its smartphone.

Clause 45. The method as claimed in clause 44, further comprising the users sharing data using their smartphones on the target prior performing said transfer of ownership.

Clause 46. A computer-readable storage medium storing computer-executable instructions which, when executed, cause a processing device to perform a method for estimating a position of a target using a plurality of smartphones, each smartphone being capable of communicating with the target over a limited wireless range, the method comprising:

receiving from a plurality of smartphones a corresponding plurality of identifications of the target to track together with corresponding time stamps and corresponding indications of the locations of the corresponding smartphone;

storing the plurality of received identifications of the target to track together with the corresponding time stamps and the corresponding indications of the locations of the corresponding smartphones;

filtering the stored plurality of received identifications of the target to track together with the corresponding time stamps and the corresponding indications of the locations of the corresponding smartphones to provide an estimation of a location of the target; and providing the estimation of the location of the target.

Clause 47. A target location estimation server, the target location estimation server comprising:

a display device;

a central processing unit;

a memory comprising a database for storing data and an application for determining an estimation of a position, wherein the application for determining an estimation of a position is stored in the memory and configured to be executed by the central processing unit, the application for determining an estimation of a position comprises:

instructions for receiving from a plurality of smartphones a corresponding plurality of identifications of the target to track together with corresponding time stamps and corresponding indications of the locations of the corresponding smartphone;

instructions for storing the plurality of received identifications of the target to track together with the corresponding time stamps and the corresponding indications of the locations of the corresponding smartphones;

instructions for filtering the stored plurality of received identifications of the target to track together with the corresponding time stamps and the corresponding indications of the locations of the corresponding smartphones to provide an estimation of a location of the target; and instructions for providing the estimation of the location of the target.

The invention claimed is:

1. A method for estimating a position of a target using a plurality of smartphones, each smartphone being capable of communicating with the target over a limited wireless range, the method comprising:

providing a target transmitting a wireless signal having a corresponding identification for uniquely identifying the target;

providing the corresponding identification of the target to track to a group of smartphones;

each smartphone of the group of smartphones being capable of receiving the signal transmitted if the target is in its vicinity and storing the corresponding identification of the target with a time stamp and an indication of a corresponding location of the smartphone;

obtaining each of the stored corresponding identification of the target with a time stamp and an indication of a corresponding location of the smartphone to thereby estimate a position of the target, wherein obtaining each of the stored corresponding identifications of the target with a time stamp and an identification of a corresponding location of the smartphone comprises determining a pertinent communication channel for transmitting each of the stored corresponding identification of the target with a time stamp and an identification of a corresponding location of the smartphone; and wherein the providing of the corresponding identification of the target to track to a group of smartphones comprises determining a subset of smartphones and broadcasting a request for tracking the target to each smartphone of the subset of smartphones.

2. The method as claimed in claim 1, wherein each of the plurality of smartphones comprises a localization system.

3. The method as claimed in claim 2, wherein the localization system comprises at least one of a Global Positioning System (GPS) receiver and a Wifi™ hotspot mapping system.

4. The method as claimed in claim 1, wherein the wireless signal is a short-range wireless signal.

5. The method as claimed in claim 4, wherein the short-range wireless signal is transmitted according to a communication standard selected from a group consisting of Bluetooth™ and Wifi™.

6. The method as claimed in claim 1, wherein the corresponding identification comprises a medium access control (MAC) address used by the target for transmitting said wireless communication signal.

7. The method as claimed in claim 1, wherein the identification for uniquely identifying the target comprises a modified medium access control (MAC) address.

8. The method as claimed in claim 1, wherein the determining of the subset of smartphones is performed according at least one criterion.

9. The method as claimed in claim 8, wherein the at least one criterion is selected from a group consisting of a determined rough estimation of a probable location of the target to track, a type of wireless communication signal supported by the target to track, a given group of users.

10. The method as claimed in claim 1, wherein the request for tracking the target comprises an identification of the target to track and at least one other parameter.

11. The method as claimed in claim 10, wherein the at least one other parameter comprises at least one of a description of the target, a command to disable the target and a command to turn the target off.

12. The method as claimed in claim 11 wherein the description of the target comprises at least one of a picture, a caption, model information and specification.

13. The method as claimed in claim 1, further comprising receiving a list of at least one target to track; further determining if the corresponding identification of the target matches the list of at least one target to track and performing said storing if the corresponding identification of the target matches the list.

14. The method as claimed in claim 1, further comprising storing additional information selected from a group consisting of a target status and a user input information.

15. The method as claimed in claim 1, wherein the obtaining of each of the stored corresponding identification of the target with a time stamp and an indication of a corresponding location of the smartphone comprises receiving each of the stored corresponding identifications of the target with a corresponding time stamp and a corresponding indication of a location of the smartphone and filtering the stored corresponding identifications of the target using the corresponding time stamps to remove the stored corresponding identifications of the target having corresponding time stamps older than a given value and the stored corresponding indications of a location for which the corresponding time stamps are older than a given value.

16. The method as claimed in claim 1, wherein the determining is performed according to at least one criterion selected from a group comprising cost and availability.

17. The method as claimed in claim 1, wherein the pertinent communication channel is selected from a group consisting of Wifi™, Bluetooth™ and a cellular data network.

18. A method for estimating a position of a target using a plurality of smartphones, each smartphone being capable of communicating with the target over a limited wireless range, the method comprising:
 providing a target transmitting a wireless signal having a corresponding identification for uniquely identifying the target;
 providing the corresponding identification of the target to track to a group of smartphones;
 each smartphone of the group of smartphones being capable of receiving the signal transmitted if the target is in its vicinity and storing the corresponding identification of the target with an indication of a corresponding location of the smartphone;
 obtaining each of the stored corresponding identification of the target with an indication of a corresponding location of the smartphone to thereby estimate a position of the target, wherein obtaining each of the stored corresponding identifications of the target with a time stamp and an identification of a corresponding location of the smartphone comprises determining a pertinent communication channel for transmitting each of the stored corresponding identification of the target with a time stamp and an identification of a corresponding location of the smartphone; and
 wherein the providing of the corresponding identification of the target to track to a group of smartphones comprises determining a subset of smartphones and broadcasting a request for tracking the target to each smartphone of the subset of smartphones.

* * * * *